United States Patent [19]

Hales

[11] 4,209,200
[45] Jun. 24, 1980

[54] BRAKE PRESSURE MODULATING VALVE

[75] Inventor: Eric C. Hales, Solihull, England

[73] Assignee: Automotive Products Limited, Leamington Spa, England

[21] Appl. No.: 856,250

[22] Filed: Dec. 1, 1977

[30] Foreign Application Priority Data

Dec. 2, 1976 [GB] United Kingdom ............... 50226/76

[51] Int. Cl.² .............................................. B60T 8/18
[52] U.S. Cl. .................................. 303/22 R; 188/195; 303/6 C
[58] Field of Search ............... 188/195, 349; 303/6 C, 303/22 R, 22 A

[56] References Cited

U.S. PATENT DOCUMENTS 4,060,283  11/1977  Demido et al. ................. 303/22 R X

FOREIGN PATENT DOCUMENTS 2504394  8/1975  Fed. Rep. of Germany ........ 303/22 R Primary Examiner—Douglas C. Butler
Attorney, Agent, or Firm—Kemon & Estabrook

[57] ABSTRACT

A hydraulic pressure control valve for a vehicle hydraulic braking system and of the type that is normally interposed between the brake master cylinder and the rear brakes so as to ensure that after a predetermined pressure is reached in the system a further pressure increase in the master cylinder produces a lesser increase in the rear brakes than in the front brakes. The predetermined pressure at which the valve begins to operate is controlled according to the load on the vehicle suspension, by a lever and control springs which are operated by changes in height of the vehicle chassis relative to the unsprung portion of the vehicle. The pressure control valve is made compact by having a control spring co-extensive with a part of the lever.

7 Claims, 4 Drawing Figures

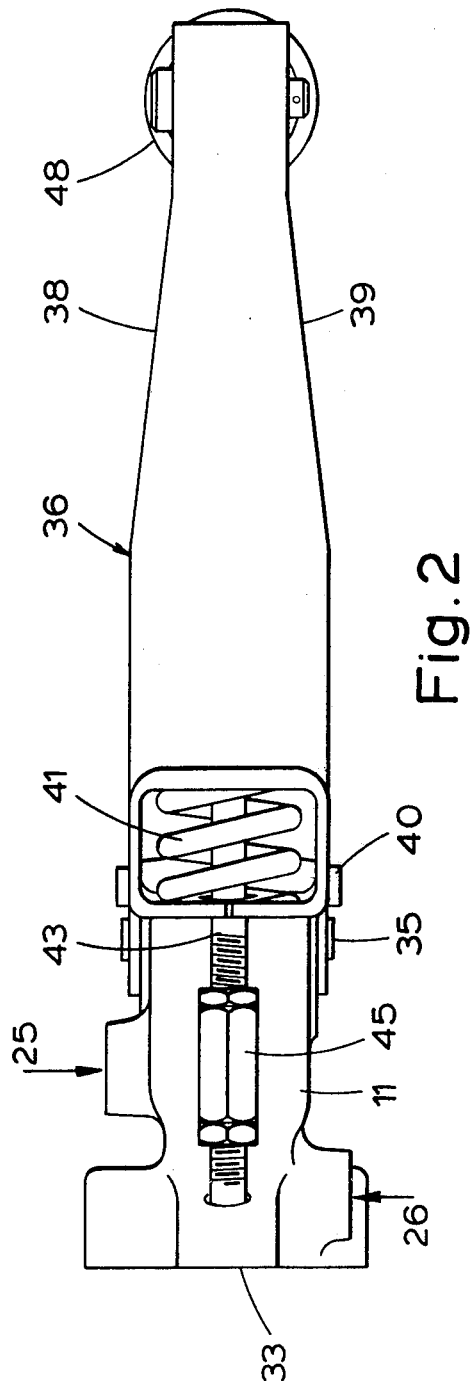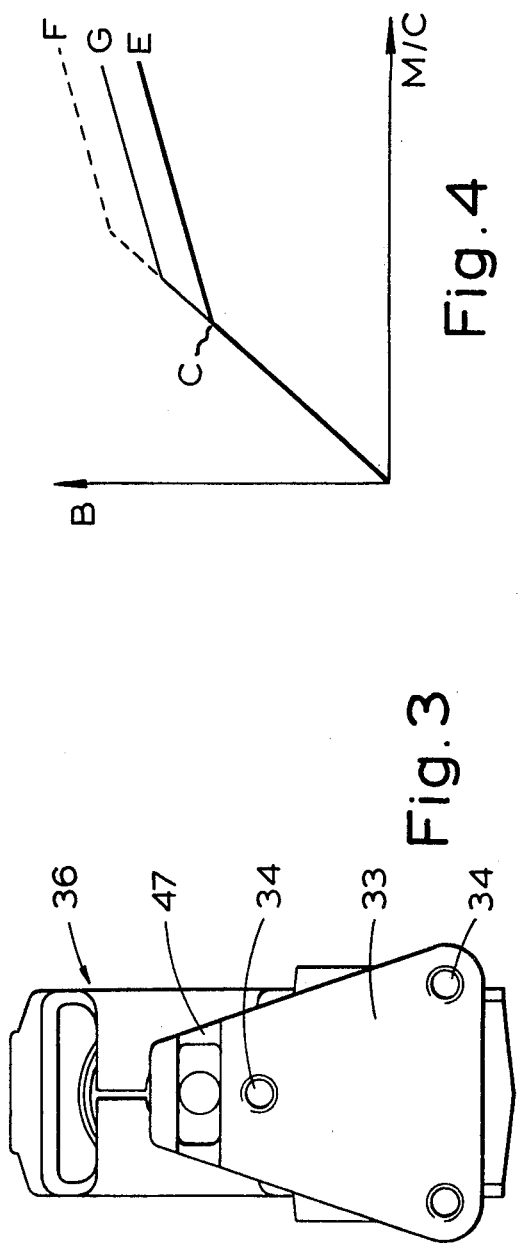

BRAKE PRESSURE MODULATING VALVE

This invention relates to a hydraulic pressure control valve for a hydraulic braking system of a vehicle and in particular to a pressure control valve with a means for sensing the load on the vehicle suspension.

A pressure control valve is normally interposed between the vehicle brake master cylinder and the rear brakes of the vehicle to ensure that after a predetermined pressure has built up in the braking system further pressure increase in the master cylinder produces a lower hydraulic pressure in the rear brakes than in the front brakes. It is known in hydraulic braking systems to provide a means for varying the predetermined pressure at which the pressure control valve begins to operate, according to the load on the vehicle suspension. Such a means is usually provided by a system of springs and levers which are operated by changes in height of the vehicle chassis relative to the unsprung portion of the vehicle, these changes in height usually being brought about by the changes in the load on the vehicle suspension system.

This system of springs and lever can be rather bulky and the object of the present invention is to produce a compact load sensitive pressure control valve.

According to this invention there is provided a vehicle brake pressure control valve comprising: a valve body having a plunger therein, an operating lever extending substantially parallel with the axis of the plunger, and a control spring to bias the lever against the plunger, wherein the control spring is a compression spring co-extensive with at least part of the operating lever.

Conveniently the lever is of a hollow construction and the compression spring is located substantially within the hollow envelope of the lever.

Preferably the lever is pressed from a sheet of metal to an L - shape pivoted near the extremity of its shorter arm to the valve body at one side of the plunger axis and with its longer arm extending substantially parallel to the plunger axis at the other side thereof.

Conveniently the compression spring acts against the shorter arm of the 'L' lever and has an indirect connection with the valve body; via a tie bar of variable length the adjustment of which alters the bias which the control spring exerts on the lever.

Conveniently the adjustment is made by means of a screw-threaded adjuster located outside the envelope of the lever and readily accessible at the exterior of the valve body.

One embodiment of this invention will now be described with reference to the following drawings in which:

FIG. 2 is a view of the pressure control valve and operating mechanism of FIG. 1 in the direction of arrow A;

FIG. 3 is another view of the embodiment shown in FIG. 1 in the direction of arrow B;

FIG. 4 is a graph of rear brake line pressure versus master cylinder pressure for a braking system incorporating the pressure control valve shown in FIG. 1.

Figure 1:
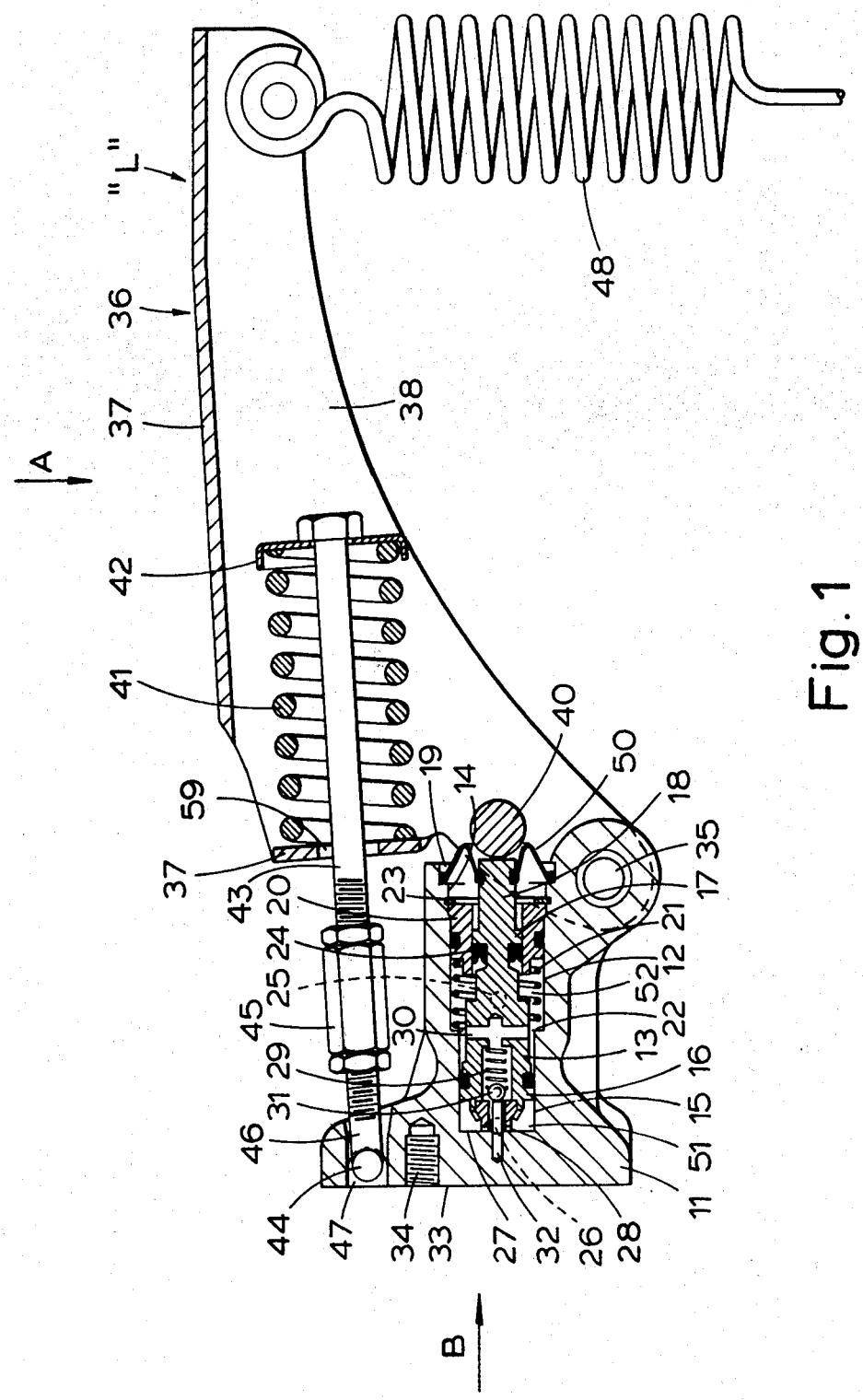
FIG. 1 is a cross-section of a pressure control valve and operating mechanism according to this invention.

The pressure control valve body 11; in FIGS. 1-3, has a blind stepped bore 12 in which a stepped piston 13 is reciprocable. The stepped bore 12 within the valve body 11 has a larger diameter portion 14 adjacent the mouth 19 of the bore and a lesser diameter portion 15 adjacent the blind end of the bore.

The stepped bore 12 is divided into an inlet chamber 52 and an outlet chamber 51 while the stepped piston 13 has a larger diameter lower portion 16, a medium diameter portion 17, and a smaller diameter portion 18 with the latter extending through the mouth 19 of the bore 12. The mouth 19 of the bore is closed by an annular housing 20 sealingly slideable within the large diameter portion 14 of the bore 12. The annular housing 20 is held in position by a spring 21 acting between the shoulder 22, formed between the larger and smaller diameter portions 14 and 15 respectively, of the bore, and an end face of the annular housing 20 so as to bias the housing 20 against a circlip 23 located in the bore 14 adjacent the mouth 19. The medium diameter portion 17 of the stepped piston 13 is sealingly slideable within the central bore 24 in the annular housing 20. The mouth 19 of the bore is covered by an elastomeric annular boot 50, the centre periphery of which grips around the smaller diameter portion 18 of the piston and the outer periphery of which is held in the mouth 19 of the bore.

An inlet port 25 from a brake master cylinder opens into the larger diameter portion 14 of the bore between the shoulder 22 and the housing 20. An outlet port 26, to the motor cylinders of a rear brake system, opens into the lesser diameter portion of the bore between the end wall 27 of the blind bore and the larger diameter portion 16 of the piston. With the piston in the position as illustrated in FIG. 1, the outlet port 26 is connected to the inlet port 25 via a slot 28, an axial passageway 29, and a diametrical passageway 30. The axial passageway 29 contains a non-return valve 31 which operates to allow fluid flow from the outlet port 26 to the inlet port 25 but not the reverse. However with the piston in the position illustrated in FIG. 1, the valve is held open by an axially aligned pin 32 set in the end wall 27 of the bore 12.

The valve body 11 has one external face 33, adapted by means of screw threaded holes 34, for mounting the valve body to the chassis of a vehicle. The term chassis also embraces body members mounted on a chassis or vehicle bodies of a monocoque construction. A lever 36 is pivoted about the valve body 11 by a pivot 35 adjacent the mouth 19 of the bore and off-set to one side of the bore. The lever 36, is of a substantially elongated 'L' shape and is pivoted from the valve body 11 by a point located at the tip of the short arm of the 'L' so that the long arm of the 'L' is generally parallel to the longitudinal axis of the bore and off-set to the opposite side of the bore to the pivot 35. Furthermore the lever 36 is of a sheet steel construction which has been formed to produce a lever of a substantially 'U' shaped cross-section comprising a elongated 'L' shaped spine 37 with two sides 38 and 39. An abutment pin 40 is arranged between the two sides 38 and 39 so as to apply any loads to the end face of the piston 13. Such loads are applied by a compression spring 41 which biases the lever 36 so as to urge the abutment pin 40 against the end face.

The compression spring 41 is housed within the box-like 'L' shape construction such that the longitudinal axis of the spring 41 is generally parallel to the axis of the bore 12, and is off-set to the opposite side of the bore to the pivot 35. The spring 41 acts between the spine 37 of the short arm of the 'L' and a cap 42 which fits over the end of the spring away from the spine 37. The cap 42 is held in position by a variable length tie 43 which extends between the cap 42 and the valve body and passes through a clearance hole 59 in the short arm of the 'L'. The tie 43 is of variable length and can be adjusted to determine the distance between the cap 42 and a predetermined pivot piont 44 on the valve body 11. The pivot point 44 is formed by a semi-circular channel 47 in the face 33 with an axial clearance hole 46 through which the tie 43 passes. The channel 47 mates with a corresponding 'T' piece on the strut 43. By altering this distance, between pivot 44 and cap 42, by means of a screw threaded adjuster 45, the load within the spring can be altered, and hence the load applied to the end face of the piston 13 by the abutment pin 40 can be altered to any preselected load within the range of the spring 41. The adjuster 45 being readily accessible on the exterior of the valve body and is located between the pivot point 44 and the lever 36.

The end of the lever 36 away from the pivot 35 is connected via a tension spring 48 to an unsprung portion of a motor vehicle (not shown). Any loads within the spring 48 will tend to reduce the load applied on the end face of the piston 13 by the abutment 40 because the extension spring 48 works in opposition to the spring 41.

With reference also to FIG. 4, with the piston in the position as shown in FIG. 1, any increase in master cylinder hydraulic pressure will result in a like increase in rear brake line hydraulic pressure via inlet port 25, diametrical passageway 30, axial slot 28, and outlet port 26. This situation will continue until such time as the fluid pressure acting on the cross-sectional area of the medium diameter portion 17 of the piston in the bore 24 is sufficient to overcome the load in the spring 41 and move the piston away from the end wall 27 of the bore. This is the point C on the graph FIG. 4 which shows rear brakes pressure versus master cylinder pressure.

The pressure at which the point 'C' is reached is the cut-off pressure and is determined by the summation of the positive load exerted by the spring 41 on the piston 13, and the negative load exerted by the spring 48 acting so as to reduce the load on the piston. Since the tension spring 48 acts between the lever 36, which is attached indirectly to the vehicle chassis, and an unsprung portion of the vehicle, say a back axle, then the lighter load in the vehicle, the greater the distance between the chassis and axle and hence the greater the stress in the spring 48. Therefore at lighter vehicle loads the summation of the load exerted the springs 41 and 48 is less, and therefore the point 'C' will be reached at a lower pressure (curve E). As the vehicle load is increased the summation of loading between the springs 41 and 48 increases and the point 'C' is reached at higher pressures (curves F and g). Hence the springs 41 and 48 can be referred to as control springs since they directly effect the pressure at which the valve operates.

When the stepped piston 13 has moved sufficiently far away from the end wall 27, the non-return valve 31 in passageway 29 will no longer be held open by the pin 32. Hence hydraulic fluid can no longer pass from the inlet side of the larger diameter portion 16 of the piston 13 i.e. chamber 52, to the outlet side of the piston portion 16 i.e. chamber 51.

A simultaneous increase in hydraulic pressure in the chamber 52 builds up until the master cylinder hydraulic pressure acting in the chamber 52 plus the load exerted by the springs on the end face of piston portion 18 overcomes the rear brakes hydraulic pressure acting in chamber 51. Hence the piston moves away from the mouth 19, the non-return valve 31 is again opened and hydraulic fluid momentarily flows into the rear brake system until the hydraulic pressure in the rear brake system acting in chamber 51, is sufficient to overcome the combined spring loads and master cylinder pressure acting in chamber 52 and the piston 13 moves to the mouth of the bore.

This process of increasing the hydraulic pressure in the rear brake system with master cylinder pressure will continue until an equilibrium is reached between the load exerted by a driver on the master cylinder and the rear brake motor cylinder, finishing with the piston 13 in a position whereby the non-return valve 31 is closed.

When the load on the master cylinder is released the piston 13 moves away from the end wall 27 immediately the pressure at the inlet 25 starts to fall, thereby allowing the rear brake system to expand and this allows the pressure in the chamber 51 to fall. This continues until the hydraulic pressure in chamber 52 reduces to just below the hydraulic pressure in chamber 51 and the piston 13 will be positioned substantially adjacent the mouth 19, the hydraulic pressure in chamber 51 is in equilibrium with the hydraulic pressure in chamber 52 plus the load exerted by the springs on the end face of the piston portion 18. Since the rear brake hydraulic pressure in the chamber 51 is therefore slightly greater than the master cylinder pressure in the bore 14 the hydraulic fluid will slowly bleed through the non-return valve 31 and the springs 41 will push the piston 13 back to the position illustrated in FIG. 1.

I claim:

1. A vehicle fluid pressure brake control valve comprising:

a valve body having a plunger therein;

an operating lever pivoted relative to the valve body and extending substantially parallel with the axis of the plunger;

and a control spring acting in compression so as to bias the lever against the plunger and which is coextensive with at least part of the operating lever;

wherein the lever is pressed from a sheet of metal and is of a hollow construction and comprises an L-shaped body having a longer and shorter arm and is pivoted near the extremity of its shorter arm to the valve body at one side of the plunger axis such that its longer arm extends substantially parallel to the plunger axis at the other side thereof, and a compression spring is located within the hollow envelope of the lever.

2. A control valve as claimed in claim 1, wherein the compression spring acts directly against the shorter arm of the L-lever.

3. A control valve as claimed in claim 2, wherein the compression spring is held between the shorter arm of the L-lever and an indirect connection to the valve body.

4. A control valve as claimed in claim 3, wherein the indirect connection is a tie pivoted at one end to the valve body and which passes freely through the shorter arm of the L-lever and carries a bearing for the spring.

5. A control valve as claimed in claim 4, wherein a substantial portion of the tie is a bar co-axial with the compression spring.

6. A control valve as claimed in claim 5, wherein the bar is a variable length bar the adjustment of which, alters the bias which the control spring exerts on the lever.

7. A control valve as claimed in claim 6, wherein the bar includes a screw-threaded adjuster located outside the envelope of the lever and which is readily accessible at the exterior of the valve body.

* * * * *